United States Patent
Silander et al.

(10) Patent No.: US 11,454,978 B2
(45) Date of Patent: Sep. 27, 2022

(54) SYSTEMS AND METHODS FOR IMPROVING GENERALIZATION IN VISUAL NAVIGATION

(71) Applicants: NAVER CORPORATION, Gyeonggi-do (KR); NAVER LABS CORPORATION, Gyeonggi-do (KR)

(72) Inventors: Tomi Silander, Grenoble (FR); Michel Aractingi, Grenoble (FR); Christopher Dance, Grenoble (FR); Julien Perez, Grenoble (FR)

(73) Assignees: NAVER CORPORATION, Gyeonggi-Do (KR); NAVER LABS CORPORATION, Gyeonggi-Do (KR)

( * ) Notice: Subject to any disclaimer, the term of this patent is extended or adjusted under 35 U.S.C. 154(b) by 378 days.

(21) Appl. No.: 16/677,001

(22) Filed: Nov. 7, 2019

(65) Prior Publication Data

US 2021/0141383 A1   May 13, 2021

(51) Int. Cl.
*G06T 7/00* (2017.01)
*G05D 1/02* (2020.01)
(Continued)

(52) U.S. Cl.
CPC ........ *G05D 1/0221* (2013.01); *G05D 1/0088* (2013.01); *G05D 1/0246* (2013.01);
(Continued)

(58) Field of Classification Search
CPC .. G05D 1/0221; G05D 1/0088; G05D 1/0246; G06T 7/90; G06T 7/20;
(Continued)

(56) References Cited

U.S. PATENT DOCUMENTS

2019/0220029 A1* 7/2019 Fukuhara ............. G06K 9/6264
2019/0232489 A1* 8/2019 Pascanu ............... G06N 3/0445
(Continued)

FOREIGN PATENT DOCUMENTS

| JP | 2019032821 A | 2/2019 |
| JP | 2019056966 A | 4/2019 |
| WO | WO-2018170421 A1 | 9/2018 |

OTHER PUBLICATIONS

First Office Action for corresponding Japanese Application No. 2020-080879 dated Jul. 6, 2021, 3 Pages. Machine Translation provided.
(Continued)

*Primary Examiner* — Tyler J Lee
*Assistant Examiner* — Tiffany P Ohman

(57) ABSTRACT

A training system for training a trained model for use by a navigating robot to perform visual navigation includes memory including N base virtual training environments, each of the N base virtual training environments including a field of view at a location within an indoor space, where N is an integer greater than 1. A randomization module is configured to generate N varied virtual training environments based on the N base virtual training environments, respectively, by varying at least one characteristic of the respective N base virtual training environments. A training module is configured to train the trained model for use by the navigating robot to perform visual navigation based on a training set including: the N base virtual training environments; and the N varied virtual training environments.

23 Claims, 10 Drawing Sheets
(6 of 10 Drawing Sheet(s) Filed in Color)

(51) Int. Cl.

| | |
|---|---|
| *G06N 3/08* | (2006.01) |
| *G06N 3/04* | (2006.01) |
| *G06T 7/20* | (2017.01) |
| *G06T 7/40* | (2017.01) |
| *G06T 7/90* | (2017.01) |
| *G05D 1/00* | (2006.01) |

(52) U.S. Cl.
CPC .................. *G06N 3/04* (2013.01); *G06N 3/08* (2013.01); *G06T 7/20* (2013.01); *G06T 7/40* (2013.01); *G06T 7/90* (2017.01); *G06T 2207/10024* (2013.01); *G06T 2207/10028* (2013.01); *G06T 2207/20081* (2013.01); *G06T 2207/20084* (2013.01); *G06T 2207/30241* (2013.01); *G06T 2207/30252* (2013.01)

(58) Field of Classification Search
CPC ............. G06T 7/40; G06T 2207/10024; G06T 2207/10028; G06T 2207/20081; G06T 2207/20084; G06T 2207/30241; G06T 2207/30252; G06N 3/04; G06N 3/08
USPC .......................................................... 701/27
See application file for complete search history.

(56) References Cited

U.S. PATENT DOCUMENTS

2020/0114506 A1* 4/2020 Toshev .................. G06N 3/084
2020/0353943 A1* 11/2020 Siddiqui .............. G06V 20/182

OTHER PUBLICATIONS

Anderson, P., Chang, A. X., Chaplot, D. S., Dosovitskiy, A., Gupta, S., Koltun, V., Kosecka, J., Malik, J., Mottaghi, R., Savva, M., and Zamir, A. R. On evaluation of embodied navigation agents. CoRR, abs/1807.06757, 2018. URL <http://arxiv.org/abs/1807.06757>.
Bonin-Font, F., Ortiz, A., and Oliver, G. Visual navigation for mobile robots: A survey. Journal of Intelligent and Robotic Systems, 53:263-296, Nov. 2008. doi: 10.1007/s10846-008-9235-4.
Bousmalis, K., Irpan, A., Wohlhart, P., Bai, Y., Kelcey, M., Kalakrishnan, M., Downs, L., Ibarz, J., Pastor, P., Konolige, K., Levine, S., and Vanhoucke, V. Using simulation and domain adaptation to improve efficiency of deep robotic grasping. CoRR, abs/1709.07857, 2017. URL <http://arxiv.org/abs/1709.07857>.
Cobbe, K., Klimov, O., Hesse, C., Kim, T., and Schulman, J. Quantifying generalization in reinforcement learning. CoRR, abs/1812.02341, 2018. URL <http://arxiv.org/abs/1812.02341>.
Cubuk, E. D., Zoph, B., Mané, D., Vasudevan, V., and Le, Q. V. Autoaugment: Learning augmentation policies from data. CoRR, abs/1805.09501, 2018. URL <http://arxiv.org/abs/1805.09501>.
Goodfellow, I. J., Shlens, J., and Szegedy, C. Explaining and harnessing adversarial examples. CoRR, abs/1412.6572, 2015.
Goodfellow, I., Bengio, Y., and Courville, A. Deep Learning. MIT Press, 2016. <http://www.deeplearningbook.org>.
Hausknecht, M. and Stone, P. The impact of determinism on learning Atari 2600 games. In AAAI Workshop on Learning for General Competency in Video Games, Jan. 2015.
Ioffe, S. and Szegedy, C. Batch normalization: Accelerating deep network training by reducing internal covariate shift. CoRR, abs/1502.03167, 2015. URL <http://arxiv.org/abs/1502.03167>.
Kempka, M., Wydmuch, M., Runc, G., Toczek, J., and Jaskowski, W. ViZDoom: A Doom-based AI research platform for visual reinforcement learning. In IEEE Conference on Computational Intelligence and Games, pp. 341-348, Santorini, Greece, Sep. 2016. IEEE. URL <http://arxiv.org/abs/1605.02097>.
Konda, V. R. and Tsitsiklis, J. N. Actor-critic algorithms. In Advances in Neural Information Processing Systems 12, pp. 1008-1014, 1999. URL <http://papers.nips.cc/paper/>1786-actor-critic-algorithms.

Levine, S., Finn, C., Darrell, T., and Abbeel, P. Endto-end training of deep visuomotor policies. CoRR, abs/1504.00702, 2015. URL <http://arxiv.org/abs/1504.00702>.
Machado, M. C., Bellemare, M. G., Talvitie, E., Veness, J., Hausknecht, M. J., and Bowling, M. Revisiting the arcade learning environment: Evaluation protocols and open problems for general agents. CoRR, abs/1709.06009, 2017. URL <http://arxiv.org/abs/1709.06009>.
Michel Aractingi, Christopher Dance, Julien Perez, Tomi Silander. Impvoing the Generalization of Visual Navigation Policies Using Invariance Regularization. ICML 2019 Workshop RL4RealLife Submission. May 5, 2019.
Mirowski, P., Grimes, M. K., Malinowski, M., Hermann, K. M., Anderson, K., Teplyashin, D., Simonyan, K., Kavukcuoglu, K., Zisserman, A., and Hadsell, R. Learning to navigate in cities without a map. CoRR, abs/1804.00168, 2018. URL <http://arxiv.org/abs/1804.00168>.
Mirowski, P., Pascanu, R., Viola, F., Soyer, H., Ballard, A. J., Banino, A., Denil, M., Goroshin, R., Sifre, L., Kavukcuoglu, K., Kumaran, D., and Hadsell, R. Learning to navigate in complex environments. CoRR, abs/1611.03673, 2016. URL <http://arxiv.org/abs/1611.03673>.
Mnih, V., Kavukcuoglu, K., Silver, D., Rusu, A. A., Veness, J., Bellemare, M. G., Graves, A., Riedmiller, M. A., Fidjeland, A., Ostrovski, G., Petersen, S., Beattie, C., Sadik, A., Antonoglou, I., King, H., Kumaran, D., Wierstra, D., Legg, S., and Hassabis, D. Human-level control through deep reinforcement learning. Nature, 518:529-533, 2015.
Mohri, M., Rostamizadeh, A., and Talwalkar, A. Foundations of Machine Learning. MIT Press, second edition, 2018.
Nair, V. and Hinton, G. E. Rectified linear units improve restricted boltzmann machines. In Proceedings of the 27th International Conference on International Conference on Machine Learning, ICML'10, pp. 807-814, USA, 2010. Omnipress. ISBN 978-1-60558-907-7. URL <http://dl.acm.org/citation.cfm?id=3104322.3104425>.
Nichol, A., Pfau, V., Hesse, C., Klimov, O., and Schulman, J. Gotta learn fast: A new benchmark for generalization in RL. CoRR, abs/1804.03720, 2018. URL <http://arxiv.org/abs/1804.03720>.
Schaul, T., Horgan, D., Gregor, K., and Silver, D. Universal value function approximators. In Proceedings of the 32nd International Conference on International Conference on Machine Learning—vol. 37, ICML'15, pp. 1312-1320. JMLR.org, 2015. URL <http://dl.acm.org/citation.cfm?id=3045118.3045258>.
Schulman, J., Levine, S., Moritz, P., Jordan, M. I., and Abbeel, P. Trust region policy optimization. CoRR, abs/1502.05477, 2015. URL <http://arxiv.org/abs/1502.05477>.
Schulman, J., Wolski, F., Dhariwal, P., Radford, A., and Klimov, O. Proximal policy optimization algorithms. CoRR, abs/1707.06347, 2017. URL <http://arxiv.org/abs/1707.06347>.
Spaan, M. Partially observable Markov decision processes. In Reinforcement Learning, pp. 387-414. Springer, 2012.
Srivastava, N., Hinton, G., Krizhevsky, A., Sutskever, I., and Salakhutdinov, R. Dropout: A simple way to prevent neural networks from overfitting. Journal of Machine Learning Research, 15:1929-1958, 2014. URL <http://jmlr.org/papers/v15/srivastava14a.html>.
Sutton, R. S. and Barto, A. G. Introduction to Reinforcement Learning. MIT Press, Cambridge, MA, USA, 1st edition, 1998. ISBN 0262193981.
Taylor, M. E. and Stone, P. Transfer learning for reinforcement learning domains: A survey. J. Mach. Learn. Res., 10:1633-1685, Dec. 2009. ISSN 1532-4435. URL <http://dl.acm.org/citation.cfm?id=1577069.1755839>.
Tobin, J., Fong, R., Ray, A., Schneider, J., Zaremba, W., and Abbeel, P. Domain randomization for transferring deep neural networks from simulation to the real world. CoRR, abs/1703.06907, 2017. URL <http://arxiv.org/abs/1703.06907>.
Zhang, C., Vinyals, O., Munos, R., and Bengio, S. A study on overfitting in deep reinforcement learning. CoRR, abs/1804.06893, 2018. URL <http://arxiv.org/abs/1804.06893>.
Zhu, Y., Mottaghi, R., Kolve, E., Lim, J. J., Gupta, A., FeiFei, L., and Farhadi, A. Target-driven visual navigation in indoor scenes

(56) References Cited

OTHER PUBLICATIONS using deep reinforcement learning. CoRR, abs/1609.05143, 2016. URL <http://arxiv.org/abs/1609.05143>.

* cited by examiner

SYSTEMS AND METHODS FOR IMPROVING GENERALIZATION IN VISUAL NAVIGATION

FIELD

The present disclosure relates to visual navigation of robots and more particularly to systems and methods for training models used by mobile robots for visual navigation.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Navigating robots are mobile robots that may be trained to navigate environments without colliding with objects during travel. Navigating robots may be trained in the environment in which they will operate.

Navigating robots may be used in various different industries. One example of a navigating robot is a package handler robot that navigates an indoor space (e.g., a warehouse) to move one or more packages to a destination location. Another example of a navigating robot is an autonomous vehicle that navigates an outdoor space (e.g., roadways) to move one or more occupants from a pickup to a destination.

SUMMARY

In a feature, a training system for training a trained model for use by a navigating robot to perform visual navigation is described. Memory includes N base virtual training environments, each of the N base virtual training environments including a field of view at a location within an indoor space, where N is an integer greater than 1. A randomization module is configured to generate N varied virtual training environments based on the N base virtual training environments, respectively, by varying at least one characteristic of the respective N base virtual training environments. A training module is configured to train the trained model for use by the navigating robot to perform visual navigation based on a training set including: the N base virtual training environments; and the N varied virtual training environments.

In further features, the at least one characteristic includes a texture of a wall.

In further features, the at least one characteristic includes a color of a wall.

In further features, the at least one characteristic includes a lighting characteristic.

In further features, the at least one characteristic includes a location of an object.

In further features, the training module is configured to train the trained model using a convolutional neural network (CNN).

In further features, the training module is configured to train the trained model using invariance regularization (IR).

In further features, the trained model is configured to, based on an input image from a camera, generate an output indicative of an instruction to one of: move the navigating robot forward by a predetermined distance; turn the navigating robot right by a first predetermined angle; turn the navigating robot left by a second predetermined angle; and not move the navigating robot.

In further features, the trained model is configured to generate the output based on a red green blue (RBG) input image from the camera.

In further features, the trained model is configured to generate the output based on a red green blue-depth (RGB-D) input image from the camera.

In further features, the trained model is configured to generate the output based on a grayscale input image from the camera.

In further features, the trained model is configured to generate the output based on a grayscale-depth (grayscale-D) input image from the camera.

In further features, the indoor space is within a building.

In a feature method for training a trained model for use by a navigating robot to perform visual navigation is described. The method includes: by one or more processors, generating N varied virtual training environments based on N base virtual training environments, respectively, by varying at least one characteristic of the respective N base virtual training environments, where each of the N base virtual training environments and each of the N varied virtual training environments includes a field of view at a location within an indoor space, and where N is an integer greater than 1; and by the one or more processors, training the trained model for use by the navigating robot to perform visual navigation based on a training set including: the N base virtual training environments; and the N varied virtual training environments.

In further features, the at least one characteristic includes one of: a texture of a wall; a color of a wall; a lighting characteristic; and a location of an object.

In further features, the training includes training the trained model using a convolutional neural network (CNN).

In further features, the training includes training the trained model using invariance regularization (IR).

In further features, the trained model is configured to, based on an input image from a camera, generate an output indicative of an instruction to one of: move the navigating robot forward by a predetermined distance; turn the navigating robot right by a first predetermined angle; turn the navigating robot left by a second predetermined angle; and not move the navigating robot.

In further features, the trained model is configured to generate the output based on one of: a red green blue (RBG) input image from the camera; a red green blue-depth (RGB-D) input image from the camera; a grayscale input image from the camera; and a grayscale-depth (grayscale-D) input image from the camera.

In a feature, a navigating robot is described and includes: a camera configured to capture images within a field of view in front of the navigating robot, where the field of view is less than wherein than 360 degrees around the navigating robot; a model that is: trained based on: N base virtual training environments at locations within an indoor space; and N varied virtual training environments generated by varying at least one characteristic of the N base virtual training environments, respectively, where N is an integer greater than 1; and configured to generate an output based on one of the images from the camera; one or more propulsion devices configured to propel the navigating robot; and a control module configured to selectively actuate one or more of the one or more propulsion devices based on the output of the model.

In further features, the model is configured to set the output to, based on the one of the images from the camera, one of a group consisting of a first state, a second state, a third state, and a fourth state; and the control module is configured to: when the output is in the first state, actuate one or more of the one or more propulsion devices to move the navigating robot forward by a predetermined distance; when the output is in the second state, actuate one or more of the one or more propulsion devices to turn the navigating robot right by a first predetermined angle; when the output is in the third state, actuate one or more of the one or more propulsion devices to turn the navigating robot left by a second predetermined angle; and when the output is in the fourth state, not actuate any of the one or more propulsion devices to not move the navigating robot.

In further features, the navigating robot is an autonomous vehicle.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present disclosure will become more fully understood from the detailed description and the accompanying drawings, wherein.

In the drawings, reference numbers may be reused to identify similar and/or identical elements.

DETAILED DESCRIPTION

Visual navigation of mobile robots combines the domains of vision and control. Navigation can be described as finding a suitable and non-obstructed path between a starting location and a destination location. Navigation from the starting location to the destination location may be split into a sequence of sub-tasks, such as map construction, localization, planning, and path following. Each sub-task, however, requires some engineering that is specific to the environment and the task. Navigation is difficult to adapt to different scenarios and environments without additional training/tuning.

A navigating robot includes a control module configured to move the navigating robot based on input from one or more sensors and using a trained model. Training the trained model using one environment may render the trained model overfit and unable to generalize to changes in the one environment or changes in its real-world environment. In the real-word, numerous variations can occur that may cause the navigating robot to be less useful than possible.

The present application involves training the trained model using reinforcement learning (RL). Models trained using deep RL training may be overfit, even when trained using multiple different environments simultaneously. According to the present application, regularization is used which combines RL with supervised learning by adding a term to the RL objective that encourages invariance of a policy to variations in observations that should not affect the action taken. This may be referred to as invariance regularization. Invariance regularization shows an improvement in the generalization of policies to environments not seen during training.

Figure 1:
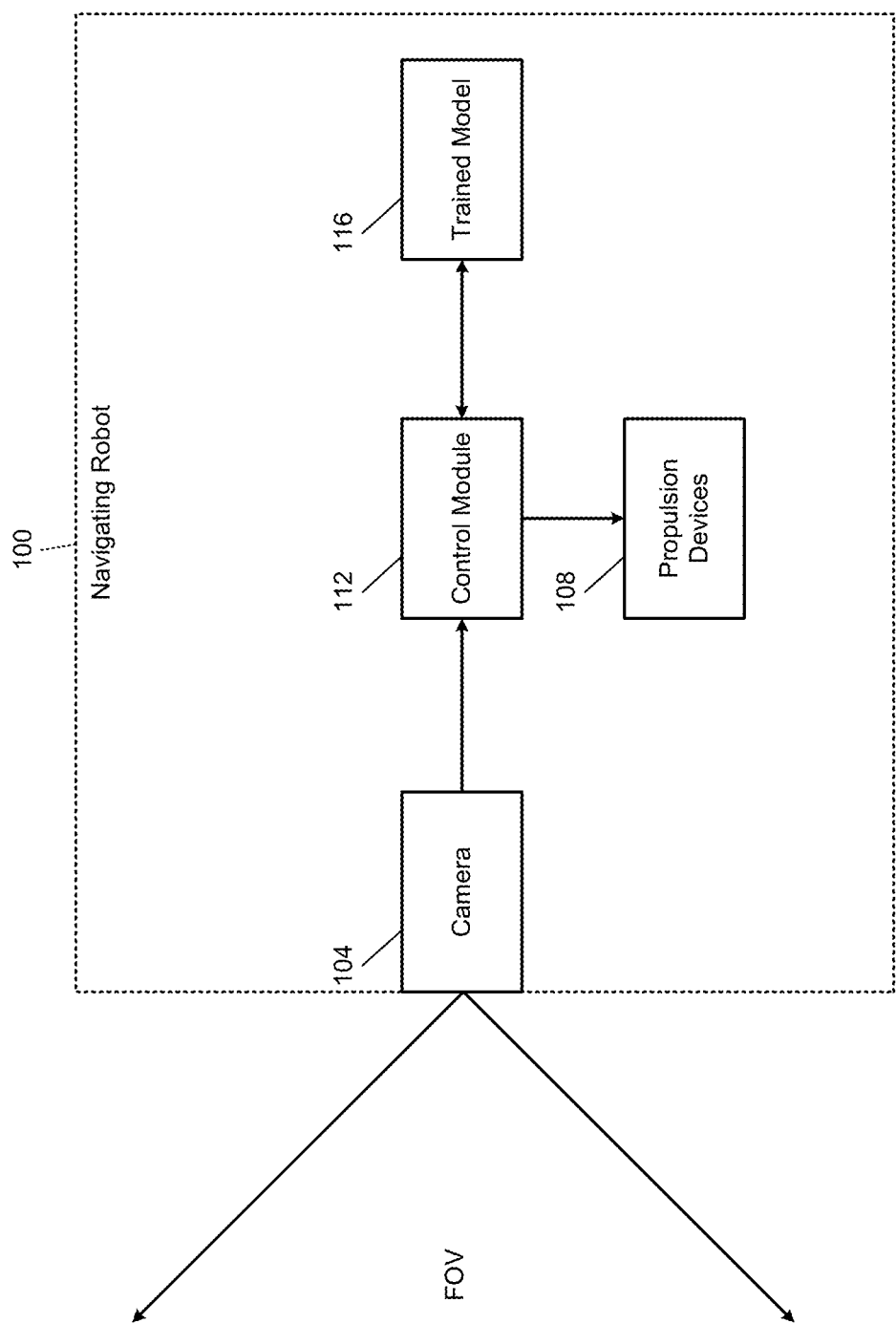
FIG. 1 is a functional block diagram of an example implementation of a navigating robot.

FIG. 1 is a functional block diagram of an example implementation of a navigating robot 100. The navigating robot 100 includes a camera 104 that captures images within a predetermined field of view (FOV) in front of the navigating robot 100. The predetermined FOV is less than 360 degrees around the navigating robot 100. The navigating robot 100 may have less than a full 360 degree FOV around the navigating robot 100. The navigating robot 100 also does not include a stored map of its operating environment. The operating environment of the navigating robot 100 is in an indoor space, i.e., within a building, parking garage, cave or other enclosure.

The camera 104 may be, for example, a grayscale camera, a grayscale-D camera, a red, green, blue (RGB) camera, an RGB-D camera, or another suitable type of camera. A grayscale-D camera includes a depth (D) component. An RGB-D camera also includes a depth (D) component. In various implementations, the navigating robot 100 may include only the (one) camera 104 and not include any other visual imaging cameras and/or sensors.

The navigating robot 100 includes one or more propulsion devices 108, such as one or more wheels, one or more treads, and/or one or more moving legs configured to propel the navigating robot 100 forward, right, left, up and/or down. A combination of two or more of the propulsion devices 108 may be used to propel the navigating robot 100 forward, to turn the navigating robot 100 right, to turn the navigating robot 100 left, and/or to elevate the navigating robot 100 vertically up or down.

The navigating robot 100 includes a control module 112 that is configured to control the propulsion devices 108 to navigate the operating environment from a starting location to a goal location without colliding with any objects based on input from the camera 104 and using a trained model 116. The trained model 116 is stored in memory of the navigating robot 100. Training of the trained model 116 is discussed below.

The trained model 116 may generate an output indicative of an action to be taken by the navigating robot 100 based on the input from the camera 104. The camera 104 may update at a predetermined frequency, such as 60 hertz (Hz), 120 Hz, or another suitable frequency. The trained model 116 may generate an output each time the input from the camera 104 is updated. The trained model 116 may be configured to set the output at a given time to one of a group consisting of: a first state (corresponding to moving forward by a predetermined distance, such as 1 foot or ⅓ of a meter), a second state (corresponding to turning right by a predetermined angle, such as 45 or 90 degrees), a third state (corresponding to turning left by a predetermined angle, such as 45 or 90 degrees), and a fourth state (corresponding to not moving).

The control module 112 is configured to control the propulsion devices 108 based on the output of the trained model 116. For example, the control module 112 may actuate the propulsion devices 108 to move the navigating robot 100 forward by the predetermined distance in response to the output of the trained model 116 being in the first state. The control module 112 may actuate the propulsion devices 108 to turn the navigating robot 100 to the right by the predetermined angle in response to the output of the trained model 116 being in the second state. The control module 112 may actuate the propulsion devices 108 to turn the navigating robot 100 to the left by the predetermined angle in response to the output of the trained model 116 being in the third state. The control module 112 may not actuate the propulsion devices 108 to not move the navigating robot 100 in response to the output of the trained model 116 being in the fourth state.

Figure 2:
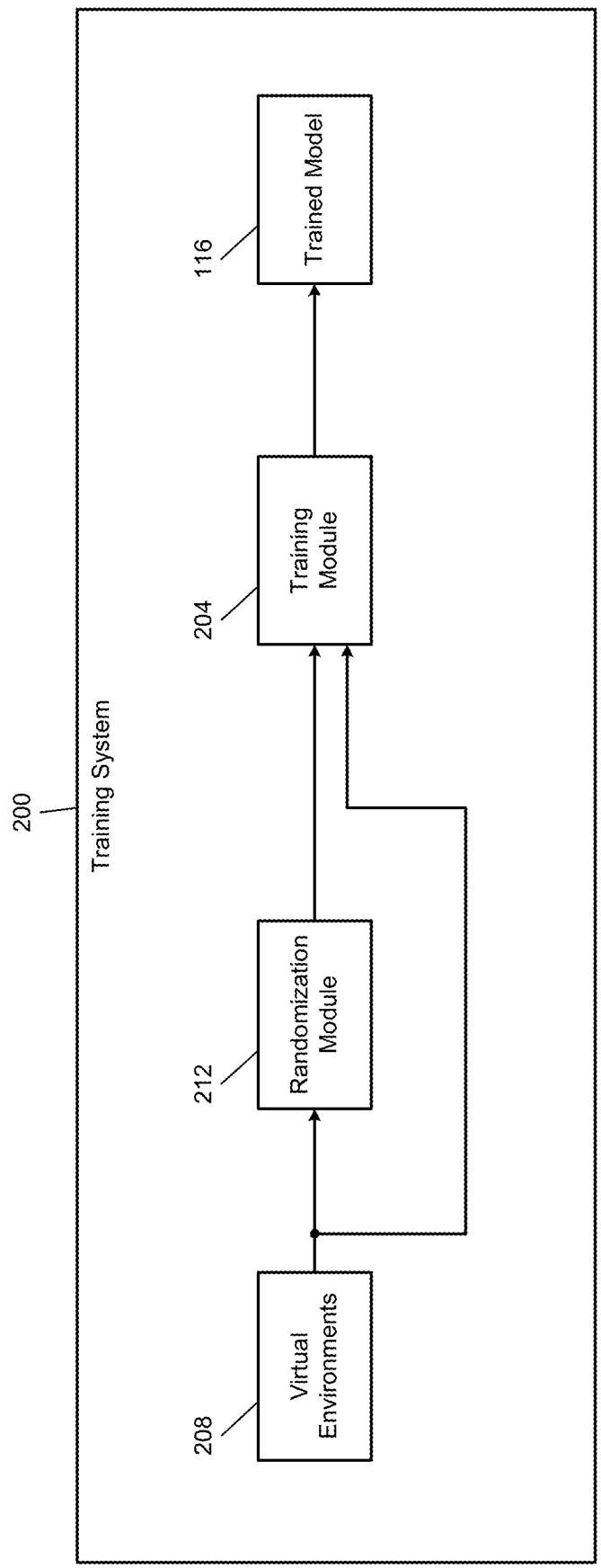
FIG. 2 is a functional block diagram of an example training system for training and generating a trained model for visual navigation by navigating robots.

FIG. 2 includes a functional block diagram of an example training system 200 for training and generating the trained model 116 for visual navigation by navigating robots, such as the navigating robot 100. A training module 204 generates the trained model 116 by performing using a set of training virtual environments stored in memory. The set of training virtual environments includes a plurality of (base) virtual environments 208 (i.e., base virtual training environments). The set of training virtual environments also includes (varied) virtual environments generated by modifying one or more characteristics of the base virtual environments 208 (i.e., varied virtual training environments). The base virtual environments 208 may include, for example, one or more rooms. For example, the base virtual environments 208 may include one or more FOVs (or points of view, POV) at one or more locations in one or more VizDoom maps. The VizDoom maps may be stored in memory of the training system 200.

A randomization module 212 varies (e.g., randomly) one or more characteristics of the base virtual environments 208 to produce the varied virtual environments used for training. For example, the randomization module 212 may vary texture on one or more surfaces in a (base) virtual environment, locations of one or more objects on one or more surfaces in a (base) virtual environment, lighting (e.g., brightness or lighting angle) of a (base) virtual environment, and/or one or more other characteristics of a (base) virtual environment. FIGS. 4-7 each include 4 illustrations of example variations generated from one of the base virtual environments 208 using randomization module 212.

The training module 204 uses the set of training virtual environments to train and generate the trained model 116.

Visual navigation may be modeled as a Partially Observed Markov Decision Process (POMDP) as a tuple $$P := \langle S, A, \Omega, R, T, O, P_O \rangle,$$

where S is the set of states, A is the set of actions, $\Omega$, is the set of observations, all of which may be finite sets. The reward function is R, where $$R: S \times A \to \mathbb{R}.$$

The conditional transition probability mass function is T, where $$T: S \times A \times S \to [0,1]$$

with the interpretation that $$T(s,a,s') = p(s_{t+1} = s' | s_t = s, a_t = a)$$

is the probability that the next state is s' given that the current state is s and that action a is taken. The conditional observation probability mass function is O, where $$O: S \times A \times \Omega \to [0,1],$$

with the interpretation that $$O(s,a,o) = p(o_t = o | s_t = s, a_{t-1} = a)$$

is the probability of observing o in state s when the last action taken was a, and allowing for a special observation probability $$O(s,o) = p(o_o = o | s_o = s)$$

when in the initial state s and no action has yet been taken. $P_0$ is the initial state probability mass function so that $$P_O(s) = p(s_o = s)$$

is the probability that the initial state is s.

The training module 204 produces a parameterized policy described by $$\pi_\theta(h,a) = p_\theta(a_t = a | h_t = h)$$

with parameters $$\theta \in \Theta,$$

giving the probability of taking action a given observation history $h_t$ $$h_t := (o_0, a_0, o_1, a_1, \ldots, a_{t-1}, o_t).$$

The objective is to adjust the parameters $\theta$ to attain a high value of a discounted reward $$J_P(\theta) := \mathbb{E}_P^{\pi_\theta}\left[\sum_{t=0}^{\infty} \gamma^t R(s_t, a_t)\right]$$

with discounted gain factor $$\gamma \in [0,1).$$

The expectation is over state-observation-action sequences $$(s_t, o_t, a_t)_{t=0}^{\infty},$$

where the initial state $s_0$ is drawn from $P_0$ and other elements of the sequence are drawn from T, O, and $\pi_\theta$.

The training module 204 trains the trained model 116 using proximal policy optimization (PPO) or another suitable type of optimization algorithm, such as a policy gradient method involving gradient ascent on estimates of the expected discounted reward.

The training module 204 utilizes a distribution D over POMDPs representing multiple environments or tasks. The training module samples $n^{train}$ (>0) POMDPs ($P_1, P_2, \ldots, P_n^{train}$) from distribution D.

The POMDPs may differ, for example, in terms of observation distributions, such as representing views of the same environment at different times of day or year, in terms of transition distributions, such as representing maps with different geometries, or in terms of reward distributions, such as corresponding to the specification of different goal states.

Given this sample set, the training module 204 learns a policy $\pi_\theta$ from a finite collection of state-observation-action sequences from the POMDPs. In various implementations, the training module 204 may require that the POMDPs have common state, observation, and observation spaces S, A, and $\Omega$. The policy $\pi_\theta$ may be said to generalize well if the policy attains greater than or equal to a predetermined value for the expectation of the discounted reward over the full distribution of POMDPs, which may be referred to as the discounted generalization reward $\mathbb{E}_{P \sim D} J_P(\theta)$.

The predetermined value may be set relative to (and less than) the maximum attainable value for the expectation or more generally relative to (and less than) the supremum $$\sup_{\theta \in \Theta} \mathbb{E}_{P \sim D} J_P(\theta).$$

Training using the set of training virtual (synthetic) environments enables a large amount of experience to be learned in a short period of time. However, there is a reality gap between the real-world (where navigating robots will operate) and the training virtual environments (where training is performed). This may be attributable, for example, to the manner in which simulators (of virtual environments) depict real-world dynamics and visual appearances. Virtual environments may capture the richness and noise of the real-world with low fidelity.

The randomization performed by the randomization module 212 may help bridge the reality gap. The randomization may be referred to as domain randomization and helps navigation robots deal with minor changes in the real-world once deployed using the trained model 116.

The domain randomization is effective to provide a policy that is invariant to changes that would appear in the observations. In terms of navigating toward a goal location (or state) with random noise added to the observations, if the navigating robot 100 is able to navigate to the goal in an environment defined by POMDP P1, then the navigating robot 100 should also be able to navigate to the goal location in another environment defined by POMDP P2 if the latter environment has the same relevant features f(P2) as the environment P1, i.e., if(P1)=f(P2). Domain randomization trains the policy as to generalize to variations and noise in the observations. Domain randomization is performed by training on multiple POMDPs (virtual environments) that share the same S, A, and $\Omega$ spaces, but each POMDP has its own unique identifier which modifies the state, therefore presenting variations of the observation of the same state.

In order to generalize well, the training objective of the training module 204 includes a term that encourages generalization. This puts the weight of the problem of generalizing in the objective function itself.

Generally speaking, a function h of variable z is invariant to a transformation $\phi$ of x if $h(x)=h(\phi(x))$. Invariance of a policy $\pi$ to changes in the observation given by a transformation T yields $\pi(o)=\pi(T(o))$. The training module 204 implements a penalty term to generalize well in the RL objective. For example, the training module 204 may train the trained model 116 using the following:

$$\max_\theta L_{PPO}(o; \pi_\theta) - \frac{\lambda}{N} \sum_i^N d(\pi_\theta(o_i), \pi_\theta(T(o_i))),$$

where $L_{PPO}$ is the PPO objective, $\theta$ is the set of parameters that define the policy $\pi_\theta$, d is a distance function between two conditional distributions, and $\lambda$ is a weighting coefficient of the penalty. o is an observation, and T is a transformation of that observation where the transformation still holds the semantic context of the underlying state but includes visual variations provided by the randomization module 212. An example may be observing a room with observation o and observing the same room with observation T(o) with a difference in wall color. It follows then that if o is observed in POMDP P and T(i) is observed in POMDP PT then f(P)=f(PT) where f(P) is the set of invariant features of the environment defined by POMDP P.

The penalty term d in the equation acts as a constraint on the PPO objective, where the new objective dictates that the policy should simultaneously obtain a high reward while behaving similarly for observations o and T(o). This is similar to trust region policy optimization where a penalty term resembling that which would result from imposing a trust-region constraint is added to ensure monotonic improvement of the average return with each policy update.

The training module 204 also performs invariance regulation (IR) during the training where the regularization term indicates the invariance of the learned policy to a transformation of given observations. The IR performed by the training module 204 may be described by the following pseudo-code.

---
Initialize $k_1, k_2, \theta_0, T_{i=\{1, \ldots, N\}}$, env.
While not converged, do
   for i=1, . . ., $k_1$, do
     // Train $\pi_\theta$ on env on the RL objective
     $\theta_i \leftarrow \max_\theta L_{PPO}(o^{env}; \pi_{\theta i-1})$
   end for
   for j=1, . . ., k2 do
     // train $\pi$ on env and T(env)
     Sample $\{\{o_t^{env}, \pi_{\theta k1}(o_t^{env})\}$
     Generate $\{o_t^{Ti(env)}, \pi_{\theta k1}(o_t^{Ti(env)})\}_{i=1,\ldots,N}$
     $\theta_j \leftarrow \min_\theta d(\pi_{\theta k1}(o_{env}) || \pi_{\theta j-1}(T(o_{env}));$
   end for
end while
return $\pi_\theta$

---

In the pseudo code above, env is the (training) virtual environment. The above may be performed iteratively and return to start for a next loop.

The training module 204 may perform IR-split or IR-full. IR-Split involves the training module 204 iteratively switching the training back and forth between maximizing the RL objective and minimizing the penalty term d. IR (full) includes the training module 204 optimizing the full objective of the IR equation provided above.

Figure 3:
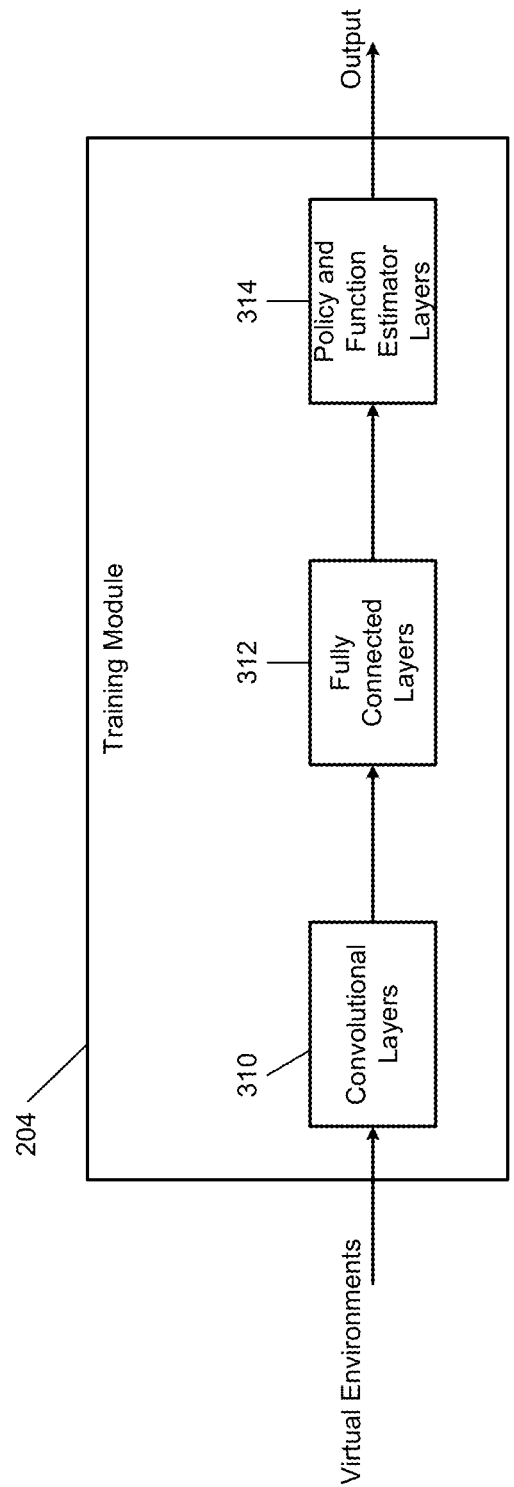
FIG. 3 includes a functional block diagram of an example implementation of the training module in FIG. 2.
Figure 4:
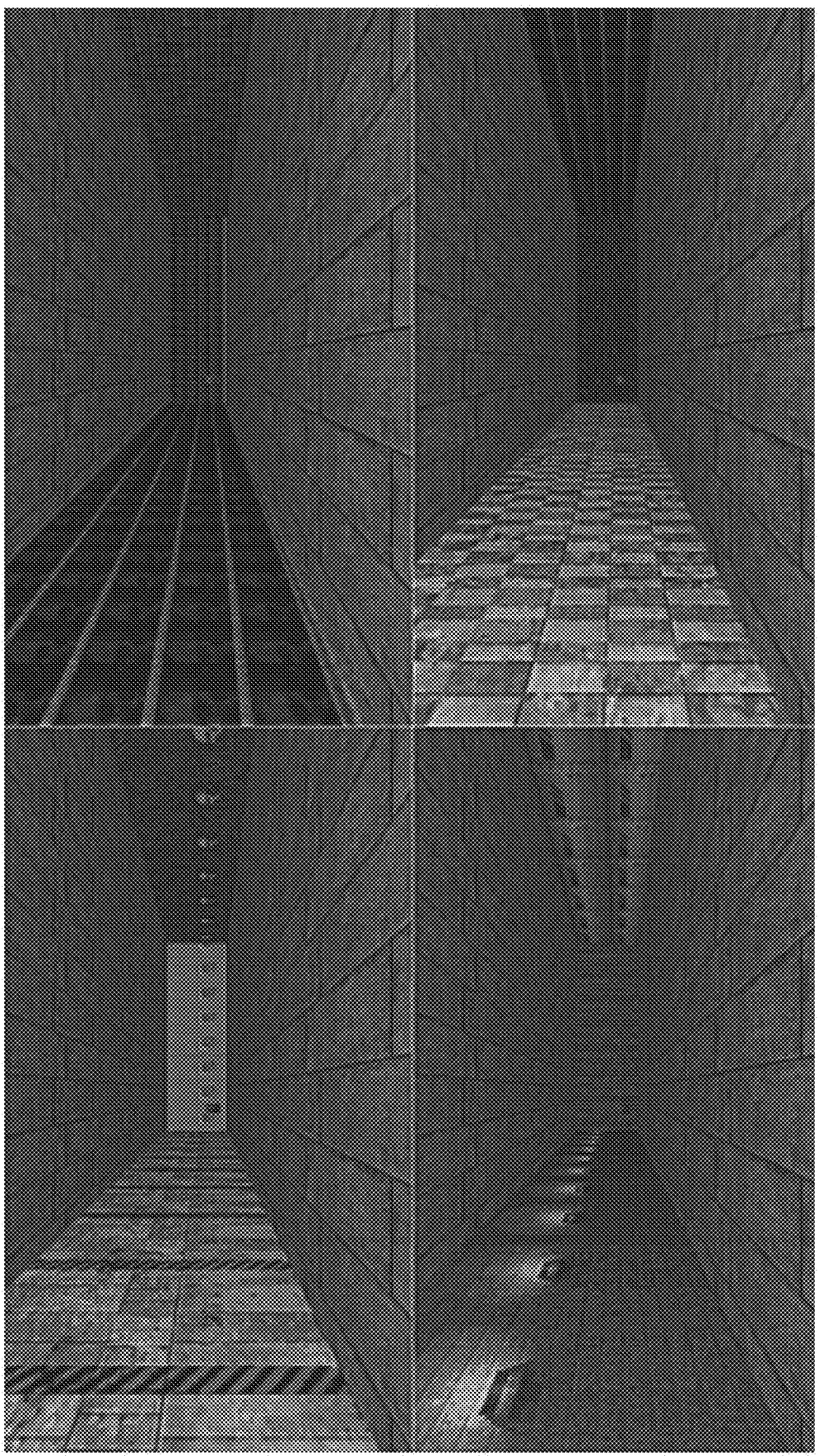
FIGS. 4-7 each include illustrations of example variations generated from a base virtual environment.
Figure 5:
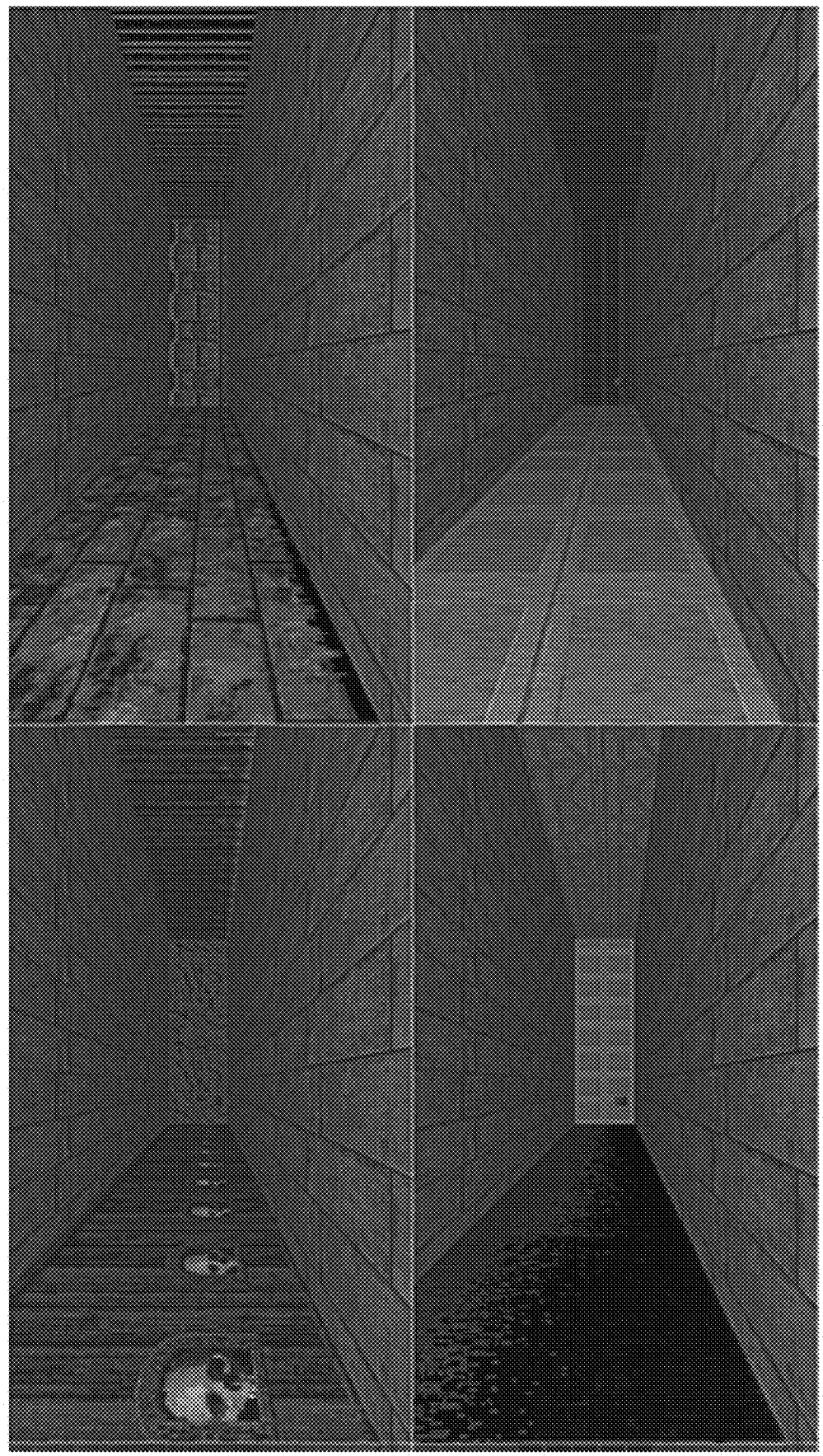
Figure 6:
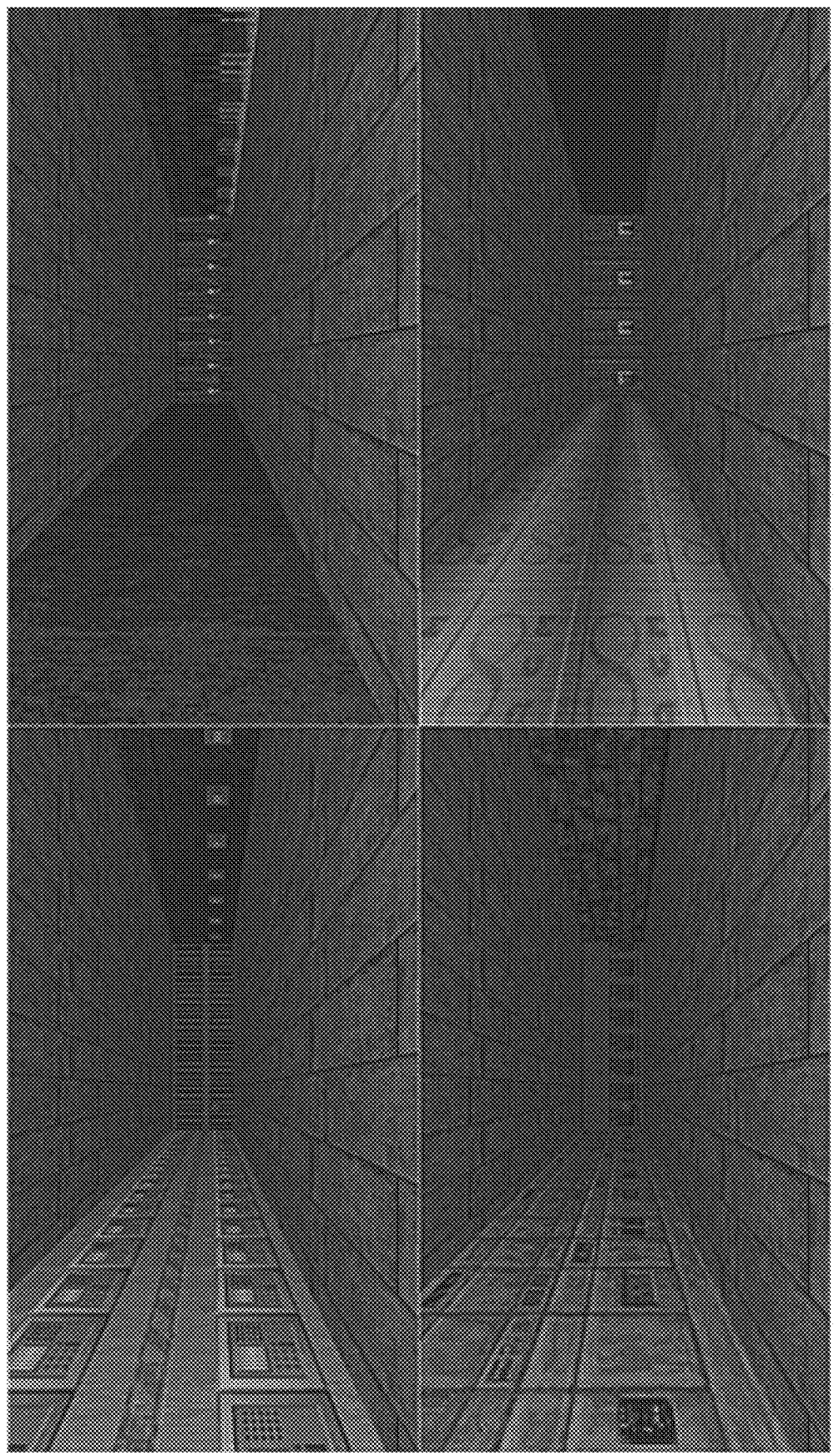
Figure 7:
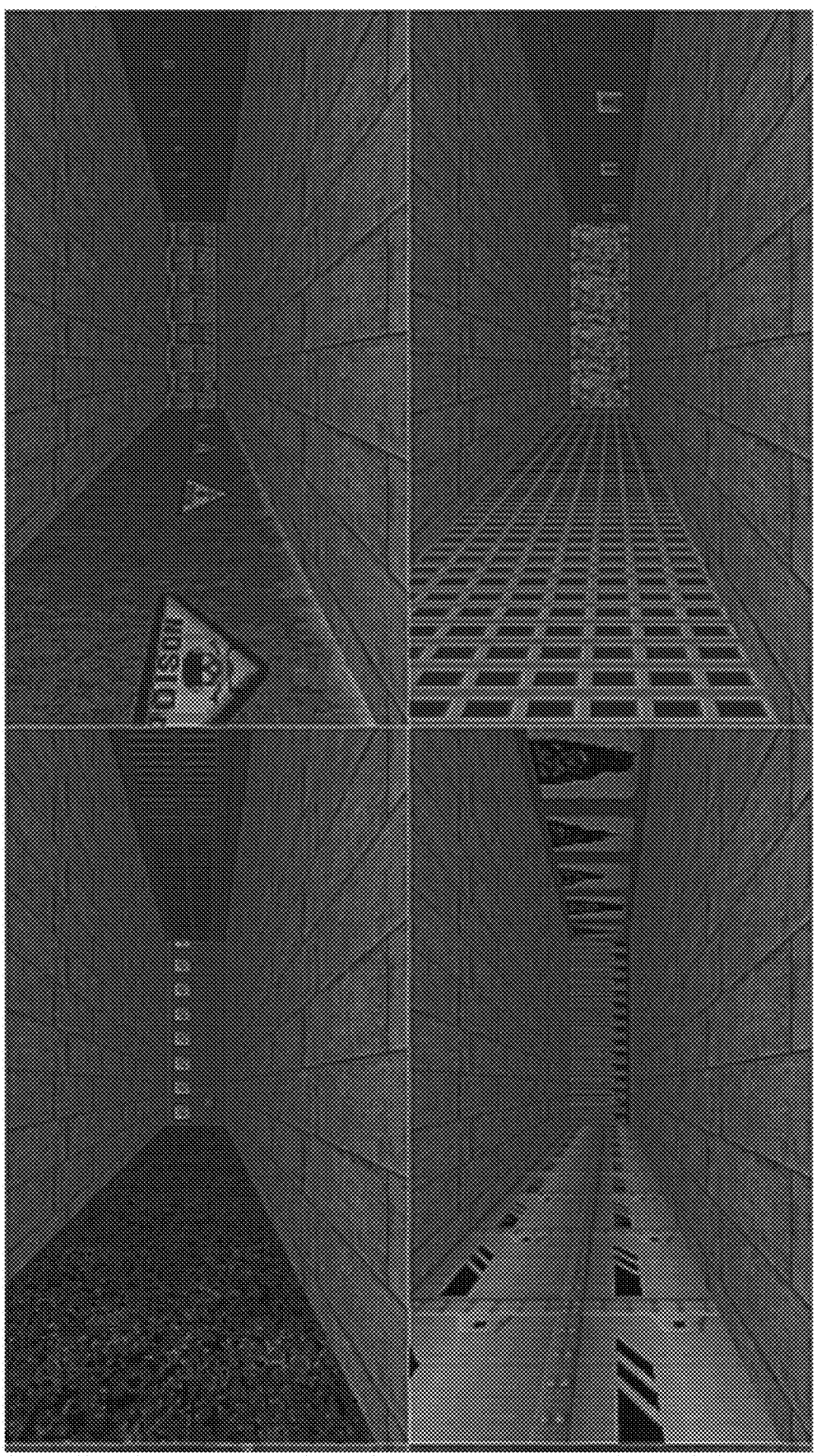

The training performed by the training module 204 may include two stages. The first stage may include performing RL discussed above, and the second stage may include supervised learning on the signal from $d(\pi(o), \pi(T(o))$. The training may include an actor-critic style agent. The training module 204 may perform the training using a convolutional neural network (CNN) as shown in FIG. 3 or another suitable type of neural network. FIG. 3 includes a functional block diagram of an example implementation of the CNN of the training module 204 shown in FIG. 2. In one example, the CNN may include, for example, three convolutional layers at 310 and 2 fully connected layers at 312, followed by the policy and function estimator layers at 314. The policy output may be a four dimensional fully connected layer, where the four dimensions correspond to four actions: move forward, turn right, turn left, and do nothing. In various implementations, the policy output may be a greater than four dimensional fully connected layer and correspond to more than four actions. For example, the raise, lower, and maintain vertical height may also be provided. The output of the policy layer may be a log probability of each action. The value layer may be a single unit that predicts the value function. Rectified linear units (ReLUs) may be used as the non-linear operations in one, more than one, or all of the layers. The training module 204 may optimize the PPO objective with a binary reward function where a reward of +1 is given if the goal location is reached and a 0 is given otherwise.

The training environments 308 in FIG. 3 include base virtual environments 208 (i.e., base virtual training environments) and varied training environments that are output from randomization module 212 (i.e., varied virtual training environments). More specifically, the randomization module 212 may generate the variations of the base virtual training environments 208, for example, by changing textures on surfaces using predetermined textures provided by the Viz-Doom environment. The number of different virtual environments used (e.g., rooms) used for training may be, for example, 1, 10, 50, 100, or 500 rooms.

Testing of the trained model 116 once fully trained may be performed using, for example, 50 rooms with textures from a held-out set which are different from the ones used to generate the training environments. Another number of rooms of a held-out set may also be used for testing.

The training module 204 may execute multiple agents in parallel during training to more quickly correct observation-action-reward data in multiple environments. Each parallel agent may be run on a variation of the virtual (training) environment. Each agent will sample one environment from the training set of environments and run on it for n episodes (where n is an integer greater than zero) before sampling another environment. The training module 204 may store a set of already-seen environments which one or more of the parallel agents can sample from. This may ensure that the agents are training on a mixture of new environments and environments that have already been sampled to ensure that all of the environments are sampled sufficiently for the training.

The use of a depth channel during the training may aid in generalization. Depth is invariant to some changes in the visible spectrum of the observations. This may lead a training agent to at least partially find an invariance in its observations in its implicit perception model. As shown in the Table below, agents including a depth channel (RGB-D and grayscale-D) may generalize better than agents without depth information.

standard deviation of agents that are trained on different numbers of virtual environments and, after training, tested on 50 test virtual environments not seen during the training. The bold values may represent the trained models that produced the best average success rate for that number of training virtual environments used and an input type.

While the example of PPO followed by IR is provided for training the trained model 116, the training module 204 may perform other training using another form of regularization, such as dropout, batchnorm, and/or L2. In the example of dropout, a dropout layer may be added after each of the convolutional layers, as discussed above. In the example of batchnorm, a batchnorm layer may be added after each convolutional layer. In the example of L2, L2 regularization may be performed. As an example, a dropout probability may be 0.1 in the example of dropout. In the example of L2, the L2 weight may be $10^{-4}$ or another suitable value.

Figure 8:
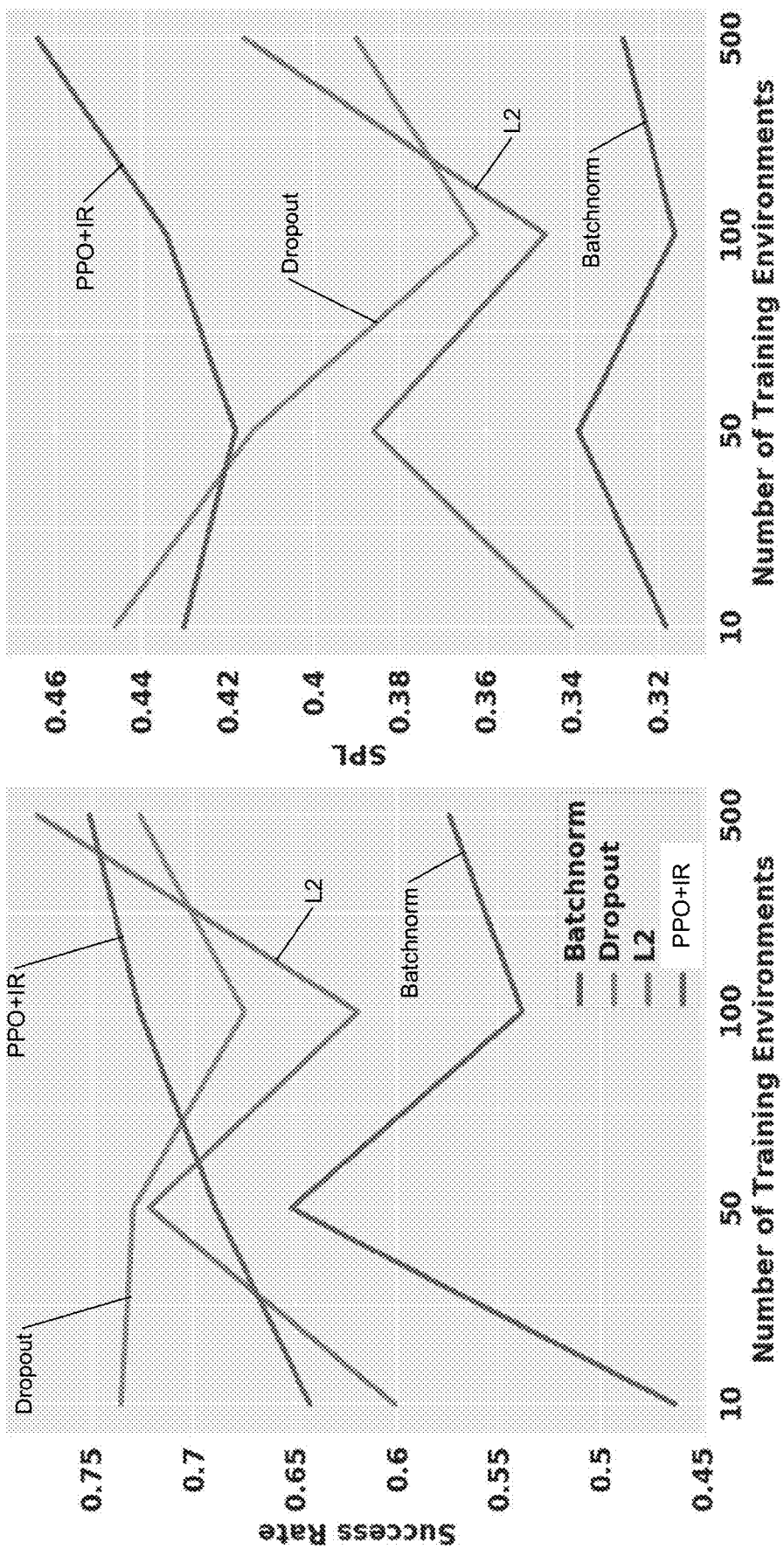
FIG. 8 includes a left graph of average success rate versus number of training events for training for different types of regularization using an RGB (without depth) input and a right graph of shortest path length (SPL) versus number of training events for different types of regularization using an RGB (without depth) input.

FIG. 8 includes a left graph of average success rate versus number of training events for training for different types of regularization using an RGB (without depth) input. FIG. 8 also includes a right graph of shortest path length (SPL) versus number of training events for different types of regularization using an RGB (without depth) input. The left graph illustrates that PPO+IR improves generally as the number of training environments used increases. SPL (in the right graph) is a measure of success rate that also takes into account the time for the agent to be successful. The right graph illustrates that PPO+IR may provide better SPL measures than dropout, L2, and batchnorm regularization.

Figure 9:
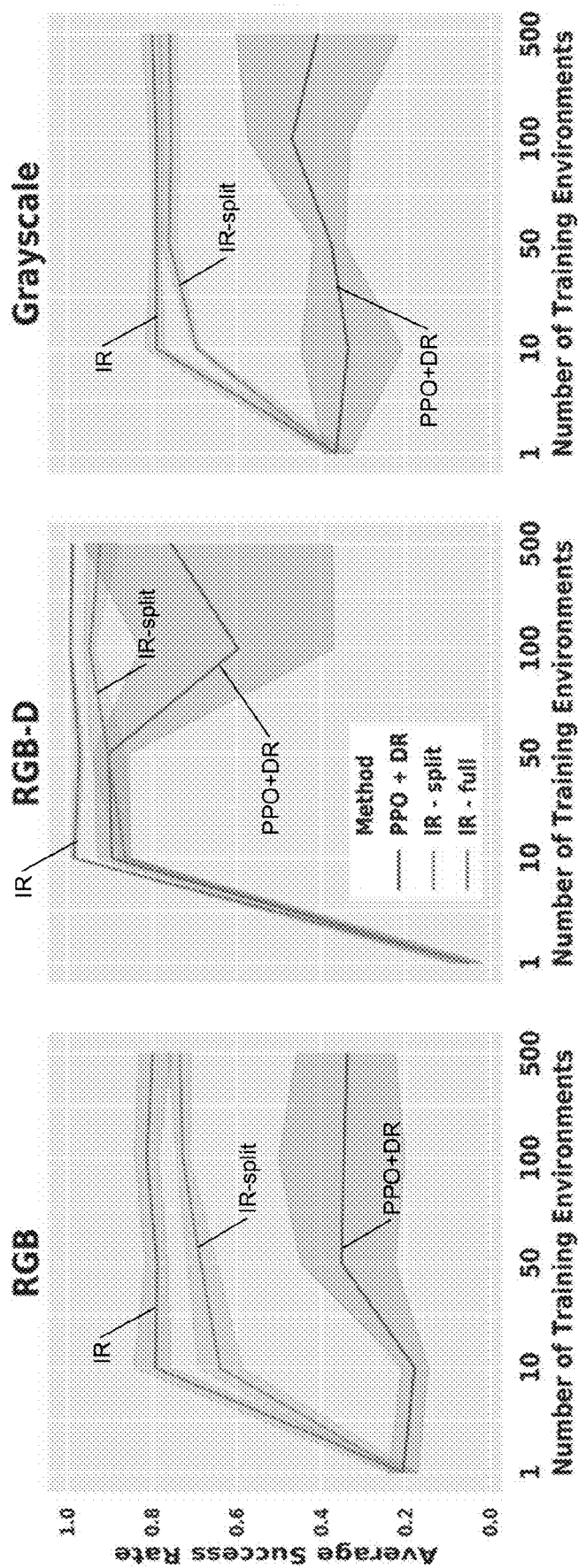
FIG. 9 includes a left graph of average success rate versus number of training events for training for different types of regularization (IR, IR-Split, and PPO+DR) using an RGB (without depth) input, a middle graph of average success rate versus number of training events for training for different types of regularization using an RGB-D (with depth) input, and a right graph of average success rate versus number of training events for training for different types of regularization using a grayscale (without depth) input.

FIG. 9 includes a left graph of average success rate versus number of training events for training for different types of regularization (IR, IR-Split, and PPO+DR) using an RGB (without depth) input. FIG. 9 also includes a middle graph of average success rate versus number of training events for training for different types of regularization using an RGB-D (with depth) input. FIG. 9 also includes a right graph of average success rate versus number of training events for different types of regularization using a grayscale (without depth) input.

IR-Split involves iteratively switching the training back and forth between maximizing the RL objective and minimizing the penalty term d. IR (full) includes optimizing the full objective of the IR equation provided above.

FIG. 9 illustrates that PPO with DR agents may overfit and have a high variance in average success rate. IR (both full and split) display stable average success rate and produce a robust policy. The IR penalty helps the model to learn the invariance features of the training environments.

| Num training envs: | 1 | 10 | 50 | 100 | 500 |
|---|---|---|---|---|---|
| | | | PPO | | |
| RGB | 0.21 ± 0.04 | 0.17 ± 0.04 | 0.35 ± 0.13 | 0.35 ± 0.16 | 0.34 ± 0.14 |
| RGB-D | 0.05 ± 0.04 | 0.89 ± 0.05 | 0.9 ± 0.05 | 0.61 ± 0.37 | 0.77 ± 0.33 |
| Grayscale | 0.36 ± 0.04 | 0.33 ± 0.13 | 0.37 ± 0.04 | 0.47 ± 0.14 | 0.41 ± 0.22 |
| Grayscale-D | 0.48 ± 0.07 | 0.88 ± 0.11 | 0.96 ± 0.02 | 0.97 ± 0.02 | 0.96 ± 0.01 |
| | | | PPO-IR | | |
| RGB | — | 0.64 ± 0.05 | 0.69 ± 0.03 | 0.72 ± 0.016 | 0.75 ± 0.02 |
| RGB-D | — | 0.85 ± 0.02 | 0.9 ± 0.047 | 0.94 ± 0.01 | 0.95 ± 0.02 |
| Grayscale | — | 0.69 ± 0.01 | 0.76 ± 0.02 | 0.75 ± 0.02 | 0.76 ± 0.02 |
| Grayscale-D | — | 0.88 ± 0.01 | 0.89 ± 0.01 | 0.9 ± 0.02 | 0.88 ± 0.01 |

Figure 10:
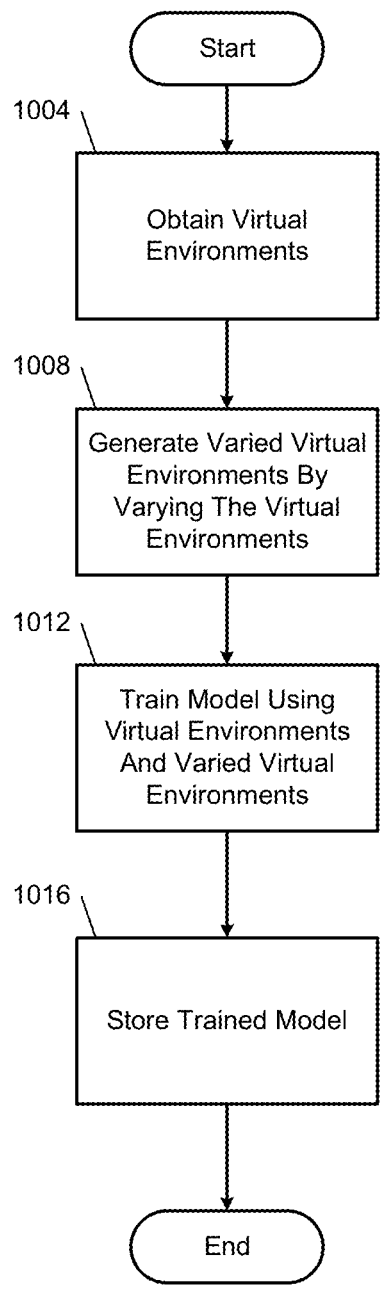
FIG. 10 includes a flowchart depicting an example method of training the model used by navigating robots for visual navigation.

The upper portion of the Table above illustrates results from use of PPO only (without IR), and the lower portion of the Table illustrates results from the use of PPO followed by IR. The values in the Table above are average success rate and FIG. 10 includes a flowchart depicting an example method of training the trained model 116. Control begins with 1004 where the training module 204 obtains the (base) virtual environments 208, such as from memory. At 1008, the randomization module 212 also obtains the virtual environments 208 and generates the varied virtual environments by varying one or more characteristics of the virtual environments 208, respectively.

At 1012, the training module 204 trains and generates the trained model 116 using the virtual environments 208 and the varied virtual environments, as discussed above. At 1016, the training module 204 stores the trained model 116, such as in memory. Once trained, the training model 116 can be stored on the navigating robot 100, such as in memory, for use in visual navigation based on input from the camera 104.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A training system for training a trained model for use by a navigating robot to perform visual navigation, the training system comprising:
    memory including N base virtual training environments, each of the N base virtual training environments including a field of view at a location within an indoor space, wherein N is an integer greater than 1;
    a randomization module configured to generate N varied virtual training environments based on the N base virtual training environments, respectively, by varying at least one characteristic of the respective N base virtual training environments; and
    a training module configured to train the trained model for use by the navigating robot to perform visual navigation based on a training set including:
        the N base virtual training environments; and
        the N varied virtual training environments,
    wherein the training includes the training module:
        first training the trained model using reinforcement learning to optimize a proximal policy optimization (PPO) objective based on a reward determined based on whether or not a goal location is reached; and
        second training the trained model using regularization based on minimizing a penalty term that acts as a constraint on the PPO objective.

2. The training system of claim 1 wherein the at least one characteristic includes a texture of a wall.

3. The training system of claim 1 wherein the at least one characteristic includes a color of a wall.

4. The training system of claim 1 wherein the at least one characteristic includes a lighting characteristic.

5. The training system of claim 1 wherein the at least one characteristic includes a location of an object.

6. The training system of claim 1 wherein the training module is configured to train the trained model using a convolutional neural network (CNN).

7. The training system of claim 1 wherein the training module is configured to train the trained model using invariance regularization (IR).

8. The training system of claim 1 wherein the training includes iteratively switching between the first and second training.

9. The training system of claim 1 wherein the trained model is configured to, based on an input image from a camera, generate an output indicative of an instruction to one of:
    move the navigating robot forward by a predetermined distance;
    turn the navigating robot right by a first predetermined angle;
    turn the navigating robot left by a second predetermined angle; and
    not move the navigating robot.

10. The training system of claim 9 wherein the trained model is configured to generate the output based on a red green blue (RGB) input image from the camera.

11. The training system of claim 9 wherein the trained model is configured to generate the output based on a red green blue-depth (RGB-D) input image from the camera.

12. The training system of claim 9 wherein the trained model is configured to generate the output based on a grayscale input image from the camera.

13. The training system of claim 9 wherein the trained model is configured to generate the output based on a grayscale-depth (grayscale-D) input image from the camera.

14. The training system of claim 1, wherein the indoor space is within a building.

15. A method for training a trained model for use by a navigating robot to perform visual navigation, the method comprising:
    by one or more processors, generating N varied virtual training environments based on N base virtual training environments, respectively, by varying at least one characteristic of the respective N base virtual training environments,
    wherein each of the N base virtual training environments and each of the N varied virtual training environments includes a field of view at a location within an indoor space, and
    wherein N is an integer greater than 1; and
    by the one or more processors, training the trained model for use by the navigating robot to perform visual navigation based on a training set including:
        the N base virtual training environments; and
        the N varied virtual training environments,
    wherein the training includes:
        first training the trained model using reinforcement learning to optimize a proximal policy optimization (PPO) objective based on a reward set determined on whether or not a goal location is reached; and
        second training the trained model using regularization based on minimizing a penalty term that acts as a constraint on the PPO objective.

16. The method of claim 15 wherein the at least one characteristic includes one of:
    a texture of a wall;
    a color of a wall;
    a lighting characteristic; and
    a location of an object.

17. The method of claim 15 wherein the training includes training the trained model using a convolutional neural network (CNN).

18. The method of claim 15 wherein the training includes training the trained model using invariance regularization (IR).

19. The method of claim 15 wherein the trained model is configured to, based on an input image from a camera, generate an output indicative of an instruction to one of:
    move the navigating robot forward by a predetermined distance;
    turn the navigating robot right by a first predetermined angle;
    turn the navigating robot left by a second predetermined angle; and
    not move the navigating robot.

20. The method of claim 19 wherein the trained model is configured to generate the output based on one of:
- a red green blue (RGB) input image from the camera;
- a red green blue-depth (RGB-D) input image from the camera;
- a grayscale input image from the camera; and
- a grayscale-depth (grayscale-D) input image from the camera.

21. A navigating robot, comprising:
- a camera configured to capture images within a field of view in front of the navigating robot, wherein the field of view is less than 360 degrees around the navigating robot;
- a model that is:
    trained based on:
        N base virtual training environments at locations within an indoor space; and
        N varied virtual training environments generated by varying at least one characteristic of the N base virtual training environments, respectively,
        wherein N is an integer greater than 1, and
    the training including:
        first training the model using reinforcement learning to optimize a proximal policy optimization (PPO) objective based on a reward determined based on whether or not a goal location is reached; and
        second training the model using regularization based on minimizing a penalty term that acts as a constraint on the PPO objective; and
    configured to generate an output based on one of the images from the camera;
- one or more propulsion devices configured to propel the navigating robot; and
- a control module that actuates one or more of the one or more propulsion devices based on the output of the model.

22. The navigating robot of claim 21 wherein the model is configured to set the output to, based on the one of the images from the camera, one of a group consisting of a first state, a second state, a third state, and a fourth state; and
wherein the control module is configured to:
- when the output is in the first state, actuate one or more of the one or more propulsion devices to move the navigating robot forward by a predetermined distance;
- when the output is in the second state, actuate one or more of the one or more propulsion devices to turn the navigating robot right by a first predetermined angle;
- when the output is in the third state, actuate one or more of the one or more propulsion devices to turn the navigating robot left by a second predetermined angle; and
- when the output is in the fourth state, not actuate any of the one or more propulsion devices to not move the navigating robot.

23. The navigating robot of claim 21 wherein the navigating robot is an autonomous vehicle.

* * * * *